United States Patent [19]

Foster

[11] 4,223,729
[45] Sep. 23, 1980

[54] METHOD FOR PRODUCING A GEOTHERMAL RESERVOIR IN A HOT DRY ROCK FORMATION FOR THE RECOVERY OF GEOTHERMAL ENERGY

[76] Inventor: John W. Foster, 2 Highlands Close, Crowborough, Sussex, England

[21] Appl. No.: 3,389

[22] Filed: Jan. 12, 1979

[51] Int. Cl.² ................. E21B 43/26; F28D 21/00
[52] U.S. Cl. ..................... 166/271; 165/45; 166/250
[58] Field of Search ............ 166/250, 271, 259, 308, 166/50; 165/1, 45; 175/61

[56] References Cited

U.S. PATENT DOCUMENTS

| | | | |
|---|---|---|---|
| 2,788,956 | 4/1957 | Pevere et al. | 166/259 |
| 3,223,158 | 12/1965 | Baker | 166/259 |
| 3,228,468 | 1/1966 | Nichols | 166/259 |
| 3,270,816 | 9/1966 | Staadt | 166/271 X |
| 3,285,335 | 11/1966 | Reistle, Jr. | 166/308 X |
| 3,637,020 | 1/1972 | McLamore | 166/308 X |
| 3,835,928 | 9/1974 | Strubhar et al. | 166/308 |
| 3,848,674 | 11/1974 | McColl | 166/308 |
| 3,863,709 | 2/1975 | Fitch | 166/271 X |
| 3,878,884 | 4/1975 | Raleigh | 166/271 |
| 4,015,663 | 4/1977 | Stubhar | 166/259 X |

Primary Examiner—Stephen J. Novosad
Assistant Examiner—George A. Suchfield
Attorney, Agent, or Firm—Pravel, Gambrell, Hewitt, Kirk, Kimball & Dodge

[57] ABSTRACT

A process for creating a hot dry rock oven for the extraction of heat energy is disclosed wherein the geothermal fluid injection and withdrawal wells are brought into positive hydraulic communication during the creation of the hot dry rock oven. The oven complex is produced by fracturing the formation from a plurality of bore holes simultaneously.

7 Claims, 1 Drawing Figure

U.S. Patent  Sep. 23, 1980  4,223,729
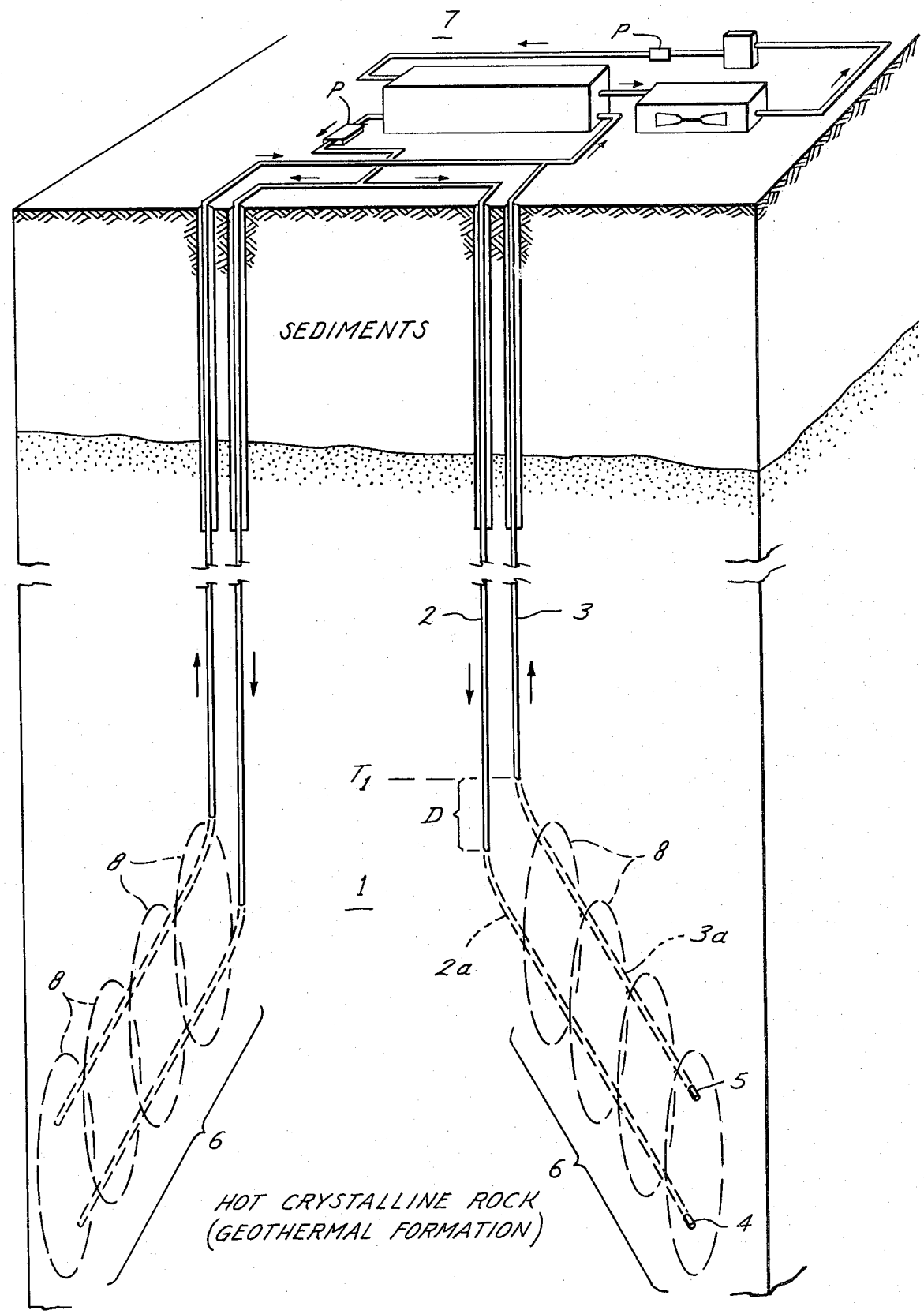

METHOD FOR PRODUCING A GEOTHERMAL RESERVOIR IN A HOT DRY ROCK FORMATION FOR THE RECOVERY OF GEOTHERMAL ENERGY

BACKGROUND

Geothermal energy is an important potential energy source. Past utilization of the potential energy available from geothermal reservoirs has been limited to natural hydrothermal underground reservoirs. Hydrothermal reservoirs contain sufficient amounts of indigenous fluid which may be brought to the surface, via a set of drilled wells, for the production of electrical energy such that they may be considered economically viable energy sources. Previously the energy contained in known hot dry rock (HDR) formations has gone untapped because such formations lack sufficient quantities of naturally contained fluid that may be brought to the surface to make electrical production economical.

Until recently, the exploitation of HDR reservoirs has not occurred, partly because of the difficulty and cost of drilling into hard, hot, crystalline rock, but primarily because the low thermal conductivities of such formations made it appear that heat energy could not be extracted at a useful rate, absent some type of downhole structure having a very large surface area. It was assumed that a heat transfer surface of the required area could not be created downhole by existing methods.

U.S. Pat. No. 3,786,858 disclosed that a heat transfer surface of practical size could be created in HDR formation by the common oil-field technique of hydraulic fracturing. This patent describes a method of creating a downhole structure for the extraction of heat energy from a HDR formation comprising, drilling a first (injection) well to the formation depth, hydraulically fracturing the formation from the injection well (to create a thin vertical disc having a large heat transfer surface), drilling a second (withdrawal) well to intersect the fracture, and circulating a heat exchange fluid within the fracture via the injection well and withdrawing it to the surface via the withdrawal well for the extraction of heat energy.

The process of U.S. Pat. No. 3,786,858 has several disadvantages. The first being that it utilizes only a single fracture plane to comprise its reservoir, thus limiting the rate at which heat may be extracted. Second, the withdrawal well must be precisely drilled to intersect the narrow fracture plane without intersecting it at a point that would short-circuit any substantial proportion of the created heat transfer area. Both intersecting the fracture plane and intersecting it at a precise point may necessitate fairly difficult and expensive directional drilling techniques.

U.S. Pat. Nos. 3,878,884 and 3,863,709 disclose methods for creating a geothermal reservoir comprising a plurality of fracture planes, thus greatly increasing the effective amount of surface area available for heat extraction. In U.S. Pat. No. 3,878,884, a first well is vertically drilled to the HDR formation, then deviated from vertical in a compass direction corresponding to the formation's lines of least principal stress. Subsequently, a plurality of parallel fracture planes are created in the formation by hydraulic fracturing at spaced apart positions along the deviated well. A withdrawal well is subsequently drilled above and parallel to the first well to intersect a majority of the fracture planes. In U.S. Pat. No. 3,863,709 a pair of wells are drilled and deviated from vertical through the HDR formation. A series of fracture planes are hydraulically induced from one of the wells and propagated through the formation to intersect the second well. Thereafter, the area along the second well at which intersection occurs is located by injection of a radioactive tracer into the fracture plane from the first well. The second well is perforated at this point to place it in hydraulic communication with the other well.

In both cases the disadvantages of properly locating the second well within the fracture complex still pertain. In U.S. Pat. No. 3,878,884 the second well must be drilled to intersect the fracture complex without short-circuiting any substantial proportion of the effective heat transfer surface of the fractures created. In U.S. Pat. No. 3,863,709 the second well must be drilled parallel to and within a preset distance of the first well, the maximum distance being the maximum radius along which a singularly induced fracture may be expected to propagate. Thus, the possibilities exist that intersection may not occur if this distance is too large or that effective heat transfer surface may be short-circuited if this distance is too small.

SUMMARY OF THE INVENTION

Applicant proposes a method by which the injection and withdrawal wells may be brought into positive communication during the creation of a heat transfer fracture complex, thus avoiding the problems of non-intersection or short-circuit intersection in previous methods. Additionally, as will become evident, Applicant proposes a method for creating fracture complexes having greater heat transfer surface areas than that attainable by the practice of prior art processes. The creation of fracture planes having greater heat transfer surfaces allows heat to be extracted at higher rates per unit of drilling costs than is achievable with prior methods.

Pursuant to the present invention, a plurality of vertical wells are drilled to the desired HDR formation. At a depth where a useful heat energy may be extracted the wells are deviated from vertical along a compass direction approximately perpendicular to the horizontal component of the anticipated fracture plane of the formation. Core samples are taken along the deviated bore holes to determine the degree of verticality (the deviation from absolute vertical of the vertical component) of the anticipated fracture plane of the deformation. Fracturing means are disposed in the plurality of deviated bore holes and aligned to fall within a single anticipated fracture plane. The formation is fractured from the plurality of bore holes simultaneously to produce a single ellipsoidal or double ellipsoidal interconnecting fracture of large surface area connecting the plurality of bore holes for hydraulic communication. Thus, the bore holes are brought into positive communication during fracture formation and a fracture of very large surface area is created.

DESCRIPTION OF THE DRAWING

The drawing illustrates a HDR geothermal formation to which a plurality of wells have been vertically drilled and, upon reaching a desired temperature level, deviated from vertical to extend through the formation approximately perpendicular to the anticipated fracture plane of the formation. Vertical fractures laterally spaced by a predetermined distance from one another along the deviated bore holes are illustrated. Surface equipment, and connecting well piping in the sedimentary overburden, for the conversion of heat energy, extracted via the plurality of wells, to electrical energy is illustrated without detail. Details of such surface equipment and connecting well structure which are well known are labeled on the drawing and shall not be further discussed.

DESCRIPTION OF THE PREFERRED EMBODIMENTS

Hot dry rock formations have permeabilities which range from a low of about $1\mu$ darcy to a high of more than 10 millidarcy. The temperature range at which useful heat energy may be extracted ranges between 100° C. for space heating purposes to 300° C. and higher for electrical production. For the purposes of the instant invention a HDR formation of low permeability is preferred, in order to minimize circulating fluid loss problems associated with high permeability formations. Since the instant invention is primarily directed to the creation of a HDR fracture complex for the production of electrical energy, a HDR formation having a temperature of about 235° C. or higher is preferred. Electrical energy may be generated from formations having somewhat lower temperatures, and temperatures higher than about 300° C. may be utilized as downhole instruments and tools become available that can tolerate such higher temperature levels.

The location of many such HDR formations, at economically accessible depths, is already known and others may be discovered by the application of geophysical techniques. With reference to the drawing, once a HDR formation 1 of desirable characteristics has been selected, a plurality of wells 2, 3 (ultimately, at least one injection 2 and one withdrawal well 3) are vertically drilled into the formation until a desired formation temperature $T_1$, preferably about 235° C., is reached. The well which will ultimately serve as the injection well 2 is extended vertically for an additional distance D that equals the separation distance between the wells as they are subsequently deviated from vertical and extended through the formation. This distance will be discussed subsequently. Generally, at depths greater than several thousand feet where most HDR formations exist, the planes along which such formations fracture are directionally orientated and aligned in an approximately vertical plane. Although some such formations have been studied to the point that the compass direction of the vertical plane along which the formation is most likely to fracture is already known, if such is not known or as an added measure, a compass directed core sample may be taken from the bottom of at least one vertical well and the core and its vacated vault analyzed for granular orientation and tectonic stress, which in conjunction with other geophysical data available on the formation, allows the direction of the plane along which a vertical fracture is most likely to occur to be determined. Other alternative methods may be employed to determine the direction of the fracture plane, such as creating a test fracture whose direction may be determined by the injection of radioactive tracers or by the use of impression packer.

After the compass direction of the most likely fracture plane for the formation is determined, the bore holes 2a and 3a are deviated from vertical in a direction approximately perpendicular to the compass direction of such planes. Although it is preferred to achieve perpendicularity between the deviated bore holes and the anticipated fracture plane, absolute perpendicularity is not essential. The deviated wells may intersect the anticipated fracture planes at an angle that departs from perpendicular by up to about 45°. The term approximately perpendicular is intended to encompass such a variance. The angle of deviation from vertical of the deviated well portions may range from as little as 5° to as much as 90°, but angles of between 30° to about 45° are preferred. The deviation angle depends upon a tradeoff determined by the temperature gradient of the formation and the drilling cost of the operation. Since generally it is preferred to extend the deviated bore holes through the HDR formation until a temperature of at least about 15° C. higher is reached, the amount of additional drilling would be a function of the temperature gradient of the formation and the angle of deviation from vertical. Irrespective of the temperature gradient, or in cases where the angle of deviation from vertical is 90°, the minimum distance the deviated wells are extended through the HDR formation must be sufficient to accommodate the multiplicity of fracture planes that will subsequently be induced along the deviated wells. This minimum distance is a function of the number of fractures desired times the spacing between the fractures.

The plurality of bore holes 2a and 3a are extended through the formation in a relationship such that one lies approximately parallel to and in approximately the same vertical plane as the other. Since the deviated portions lie within a low permeability formation, it is presently believed that this portion may be drilled without the necessity of using production tubing or casings. The omission of production tubing would significantly reduce construction cost, and is preferred. But, in the event that fracturing cannot be properly inititated in the absence of production tubing, it may be extended along the deviated portions. After the plurality of the bore holes has been extended throughout the HDR formation for the desired distance, another compass orientated core sample is taken from the bottom of at least one deviated bore hole and preferably all bore holes. These samples and/or their vacated vaults are analyzed to determine the rock's granular orientation, tectonic stress and other physical properties in order to determine the degree of verticality which may be expected for the most likely fracture plane of the formation.

The spacing of the plurality of wells along their deviated lengths D is determined primarily by the distance that a hydraulically induced fracture may be expected to propagate within the formation. If such distance is already known from field studies then the plurality of wells may be simultaneously completed, with a separation along their deviated portions of slightly less than about twice the radius of the propagation distance of a single fracture. This distance may be made as much as two and a half times the propagation distance since the radial distance between the wells of the single interconnecting fracture to be subsequently induced by simultaneous fracturing from the plurality of wells should exceed the sum of the radii of two singularly induced fractures. But to insure the highest possibility of fracture interconnection and to provide a margin for error, it is preferred to maintain the distance at not greater than twice the propagation distance.

In the event that the propagation distance is not predictable by calculations, then the plurality of wells may be completed sequentially, with a test fracture induced at the bottom of the first completed well. The propagation distance of any singularly induced test fracture may be measured and the other well or wells subsequently completed so as to lie at a distance of no more than twice the propagation distance from the first well.

Upon completion of the deviated bore holes the formation is fractured from at least two bore holes, 2a and 3a, simultaneously. Simultaneous fracturing may be accomplished by use of straddle packer technology. Double isolation packers 4 and 5 (illustrated by accented lines of the bore holes in the drawing) are inserted in the plurality of bore holes and are aligned in relationship one to another such that the plane in which the packers lie correspond in direction to the vertical direction of most likely fracture plane as previously determined. Each straddle packer zone 4 and 5 is sealed on the down-side and up-side of each packer zone contemporaneously by hydraulic or mechanical means. Pressure is gradually and contemporaneously increased, via independent hydraulic systems, in each hole such that the rock failure pressure is achieved within the space of a few seconds—essentially simultaneously—in each bore hole. The pressure necessary to induce fracturing may be calculated based largely upon the tensional strength of the rock in situ at each bore hole. Alternatively, and more accurately, a single test fracture may be induced in one bore hole and the fracture pressure determined empirically.

It is important that the hydraulic pressure within each packer zone be contemporaneously increased in a gradual manner, over about 10 to 30 minutes. Gradually increasing the pressure exerts a stress on the exposed rock at the packer site which increases the molecular pressure of the rock at these areas. The stress radiates through the rock. To allow the stress to extend for a maximum distance from each packer zone, such that the stress exerted from each bore hole will overlap at a point between the holes, the pressure increase must be brought about gradually and contemporaneously. Increasing the molecular pressure or stress on the rock between the bore holes makes it more susceptible to fracturing. Thereafter, as the fracturing pressure applicable to each bore hole is contemporaneously attained, fracturing occurs at each, essentially within the space of a few seconds of each other, and occurs along the lines of maximum stress to create a single large interconnected fracture.

The gradual increase in pressure to create the overlapping area of stress between the bore holes prior to fracturing is important for another reason. All hydraulically induced fractures in HDR formation have very narrow widths. In the case of a singularly propagated fracture, the width of the fracture becomes progressively narrower toward its outer perimeter, and at its fringe is zero. If it were attempted to create a single interconnecting fracture by sequential fracturing at each bore hole, at best the single fracture would be the product of two singularly induced fractures that intersect and interconnect at their respective outer perimeters. The area of interconnection would also be an area of minimal fracture width, thus creating an area of high impedance or resistance to the flow of heat exchange fluid through such a fracture. This high impedance area would significantly lower the hydraulic efficiency of subsequent heat extraction operations. By creating an area of overlapping stress in the rock between the bore holes where interconnection occurs upon simultaneous fracturing, the width of the resultant fracture that occurs in the area of overlap should be greater than that which would result from sequential fracturing.

The attainment of fracturing pressure in each bore hole simultaneously induces by encouragement a simultaneous rock failure resulting in a maximum probability of achieving hydraulic interconnection between the bore holes. The induced fracture 8 has a very large surface area with minimum impedance at the area of interconnection and should form along an essentially single plane. The interconnected fracture 8 may be slightly irregular, thus not literally a single ideal plane, but shall be hereafter referred to as a single plane feature.

In a preferred fracturing mode, the hydraulic pressure in the straddle packer zones of each bore hole is gradually contemporaneously increased to a point just below the calculated or measured rock failure point at each packer site, and held steady. Subsequently, a simultaneous surge of high pressure, such that the total pressure in the packer zones of each bore hole substantially exceeds the rock failure pressure, is applied to the packer zones of all involved bore holes. The sudden simultaneous exertion of high pressure greatly enhances the likelihood that fracturing shall occur simultaneously and thus create a single large interconnected single plane fracture.

The sudden pressure surge may be achieved in a number of ways. For instance, an auxiliary pump may be employed at the surface to produce a reservoir filled with highly pressurized hydraulic fluid. This high pressure reservoir would be interconnected to the hydraulic systems of the packers by quick release valves. After near rock failure pressure is achieved downhole via the primary pumps, the quick release valves are opened allowing the high pressure reservoir to suddenly release into the hydraulic lines of each packer zone. This not only would create the necessary surge of high pressure, but additionally the pressure would be maintained throughout the rock failure process.

A hydraulic ram may be connected to the hydraulic lines for each packer zone to provide the sudden pressure surge. Alternatively, the hydraulic lines could be connected to an explosive device on the surface, as illustrated in U.S. Pat. No. 3,848,674 or explosives may be employed down-hole to create the simultaneous exertion of a high pressure surge.

After the initial fracture is created, the straddle packers are de-pressurized or mechanically released and moved to a new position in each bore hole and the process is repeated to create another fracture. It is preferred that the initial fracture be induced at the lowest part of the deviated bore holes, and the process sequentially repeated at higher positions.

The repetitive process of producing simultaneous single plane fractures 8 results in a massive fracture complex 6 which shall be referred to as a hot-rock oven. The drawing, for the sake of clarity, only illustrates a complex comprising four fractures. But it is to be understood that a complex comprising a substantially larger number of fractures may be created by the process of the instant invention. The individual fractures comprising the oven should be spaced about 20 to 50 meters apart in order to insure that each operates essentially in thermal isolation from the other. To insure that such fractures do not close they may be propped with sand, gravel, artificial propping agents or the like.

The hot-rock oven so created comprises millions of square feet of heat exchange surface for heat extraction by the circulation of a heat exchange fluid, such as water, sufficient to provide adequate capacity and insure an economically acceptable lifetime for the oven. The heated fluid which is conveyed to the surface will be employed to provide heat energy or to generate electrical energy through heat exchange surface installations 7, or for other purposes. Since it is contemplated to operate the heat exchange operation as a closed earth loop, the heat exchange fluid may be continually cycled through the hot rock oven for heat extraction. Such an oven shall also be sufficiently transmissible to the circulation of geothermal fluid as to offer acceptable levels of impedance to liquid flow through the required earth loop.

In the event that heat extraction for an extended period of time causes a decline in the hot-rock oven temperature to an unacceptable level, a new oven complex may be created by extending all bore holes and simultaneously fracturing a virgin section of the formation substantially as previously described. The old oven may be isolated from the geothermal circuit until such time that its virgin temperature regenerates whereupon it may be returned to service in the subsurface circuit.

While the process described herein has been in terms of creating an underground oven complex for the extraction of heat energy, other applications of this process are possible. The process may also be used in formations other than HDR formations to create subsurface storage space for the disposal of waste materials, such as radioactive solids and liquids. Additionally, the process can be used to create an underground complex for the gassification of coal or for the mining of minerals by injection of steam or chemicals into the subsurface environs.

Having made a full disclosure of the new process, it should be understood that certain modifications therein may be apparent to those of ordinary skill which do not depart from the scope and spirit of the invention as described herein and claimed as follows:

I claim:

1. A process for creating a fracture complex in a hot dry rock formation, comprising the steps of:
    (a) drilling at least one fluid injection well and one fluid withdrawal well which are approximately vertical to the approximate location within a crystalline rock formation at which a temperature exists from which useful heat energy may be extracted;
    (b) deviating said wells from their vertical orientation in a direction approximately perpendicular to the compass direction of the most likely fracture plane of said formation such that said withdrawal well lies above, parallel to and in approximately the same vertical plane as the fluid injection well;
    (c) simultaneously fracturing said formation from said injection and withdrawal wells to produce a single interconnecting fracture of large surface area connecting said wells for hydraulic communication.

2. The process of claim 1, further comprising:
    orientating means for fracturing said formation within said injection and withdrawal wells in alignment with the vertical direction of the anticipated fracture plane of said formation.

3. The process of claim 2, further comprising:
    gradually and contemporaneously pressuring the fracture means to the rock failure pressure to simultaneously fracture the formation from said wells.

4. The process of claim 3, wherein the pressure of the fracture means are contemporaneously increased over a period of time from about 10 to about 30 minutes.

5. The process of claim 1, wherein simultaneous fracturing is repeated at a plurality of parallel positions along the deviated portions of said injection and withdrawal wells to create a fracture complex.

6. The process of claim 5, wherein the separation between the plurality of fractures is from about 20 to about 50 meters.

7. The process of claim 1, where the injection and withdrawal wells are separated along their deviated portions by a distance slightly less than approximately twice that of the distance a singularly induced fracture will propagate within the formation.

* * * * *